United States Patent [19]

Momont et al.

[11] Patent Number: 6,098,959
[45] Date of Patent: Aug. 8, 2000

[54] PRESSURE REGULATOR FOR WATERING SYSTEM

[75] Inventors: Timothy W. Momont, Wolcottville; Philip Wilfong, Goshen, both of Ind.

[73] Assignee: CTB, Inc., Milford, Ind.

[21] Appl. No.: 09/383,756

[22] Filed: Aug. 26, 1999

Related U.S. Application Data

[62] Division of application No. 08/979,335, Nov. 24, 1997, Pat. No. 5,967,181.

[51] Int. Cl.[7] .................................................. F16K 27/00
[52] U.S. Cl. .............................................. 251/367; 119/72
[58] Field of Search ..................... 251/367, 366; 137/315; 119/72, 74, 75

[56] References Cited

U.S. PATENT DOCUMENTS

| | | |
|---|---|---|
| 163,166 | 5/1875 | Dunbar et al. . |
| 1,984,328 | 12/1934 | Bechtold . |
| 2,083,966 | 9/1937 | Stitzer ................................ 251/367 X |
| 2,960,998 | 11/1960 | Sinker et al. . |
| 4,129,145 | 12/1978 | Wynn . |
| 4,244,526 | 1/1981 | Arth . |
| 4,344,456 | 8/1982 | Hostetler . |
| 4,539,938 | 9/1985 | Maranell et al. ......................... 119/75 |
| 4,682,625 | 7/1987 | Christopher . |
| 4,867,198 | 9/1989 | Faust . |
| 4,922,955 | 5/1990 | Uri . |
| 4,960,260 | 10/1990 | McEnearney . |
| 4,971,117 | 11/1990 | Hendrickson . |
| 5,161,572 | 11/1992 | Oberl et al. . |
| 5,172,716 | 12/1992 | Paptzun . |
| 5,184,571 | 2/1993 | Hostetler et al. . |
| 5,209,265 | 5/1993 | Taguri et al. . |
| 5,239,944 | 8/1993 | Hostetler . |
| 5,245,950 | 9/1993 | Johnson ..................................... 119/72 |
| 5,255,632 | 10/1993 | Thomas et al. . |
| 5,257,918 | 11/1993 | Kraemer . |
| 5,294,058 | 3/1994 | Einav . |
| 5,402,750 | 4/1995 | Katz . |
| 5,429,072 | 7/1995 | Schumacher . |

OTHER PUBLICATIONS

Jan. 16, 1997 Protest Under 37 CFR 1.291(a) and related prior art materials attached thereto, namely: —E–Z SIP #1025 Floor Watering System Installation, Operation and Maintenance Instructions, Date Coded 7–89, ©1989.—E–Z SIP #1400 Floor Watering System Installation, Operation and Maintanance Instructions, Date Coded 11–91, ©1991.— Ziggity Systems–Ziggity–Flo Regulators, The Solution To Efficient Water Management, Date Coded 1–91, ©1991.

Feb. 6, 1998 Protest Under 37 CFR 1.291(a) and related Declaration by Timothy Momont and Exhibits attached thereto.

(List continued on next page.)

*Primary Examiner*—Kevin Lee
*Attorney, Agent, or Firm*—Trexler, Bushnell, Giangiorgi & Blackstone, Ltd.

[57] ABSTRACT

A pressure regulator for a drinking system for birds or other animals that includes a housing and first and second engaging members for engaging the elongated supports for the fluid supply conduit of the drinking system. The first engaging member includes a pair of ends, each end including a plurality of flexible fingers extending generally parallel to the fluid supply conduit. The second engaging members are adapted to engage the flanges of the elongated supports. The pressure regulator includes a valve element and the housing desirably defines a valve bore for receiving the valve element. The valve element desirably includes a circular seal having a peripheral edge that extends radially inwardly and that includes a lip for sealing the valve bore when the valve element is in the closed position. Desirably, the housing includes a central portion that defines a central channel having a larger diameter than a fluid inlet channel defined by the housing, and an air exhaust port associated with the central portion for exhausting air trapped within the central portion. The housing also desirably is configured to facilitate quick and easy removal and replacement of the seal. The pressure regulator may be used in connection with poultry houses having sloped floors.

16 Claims, 5 Drawing Sheets

OTHER PUBLICATIONS

Mar. 1, 1998 Answer To Protest Dated Feb. 6, 1998 and related Declaration by Oded Katz.

Partial Prosecution File for U.S. Pat. Appln. No. 08/435,430, namely:—Specification, claims and drawings as originally filed on May 10, 1995.—Office Action dated Sep. 26, 1996.—Amendment dated Oct. 4, 1996 in Response to Office Action dated Sep. 26, 1996.—Notification OF Withdrawal From Issue mailed Sep. 22, 1997.—Amendment dated Oct. 12, 1997 in Response to Protest dated Jan. 16, 1997 and related Declaration of Oded Katz.

SL–925A Ziggity–Flo Regulator—Assembly, Installation and Operating Instructions, ©1990.

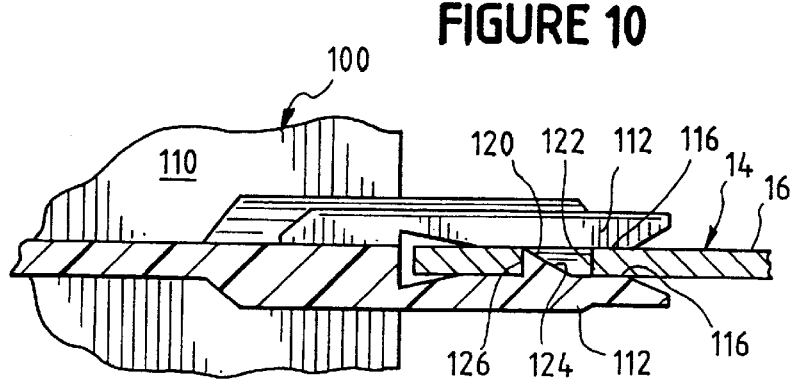
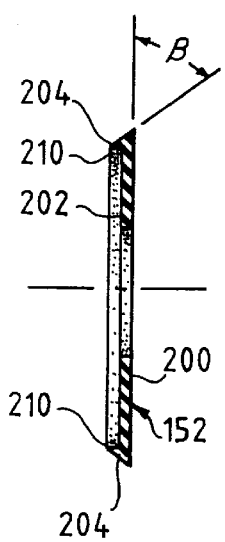

PRESSURE REGULATOR FOR WATERING SYSTEM

This is a divisional of application Ser. No. 08/979,335 filed on Nov. 24, 1997, U.S. Pat. No. 5,967,181.

The present invention relates to a pressure regulator for a watering system for poultry and other small animals.

BACKGROUND

Watering systems for poultry houses usually include a water supply conduit that extends over the floor of the poultry house, which is typically built with a predetermined slope from one end to the opposite end to facilitate drainage. Because the water supply conduit is suspended at the same slope over the floor so as to be parallel with the floor, the slope causes an increase in pressure along the length of the water supply conduit toward the low end of the slope. As a result, water is supplied to the drinkers at the lower end of the water supply conduit at a higher pressure than at the upper end.

This problem is often addressed by providing pressure regulators along the length of the water supply conduit to maintain the same pressure along its length. The pressure regulators are often difficult to secure effectively to the water supply conduit because the water supply conduit is usually engaged with and supported by an elongated support that extends substantially along the length of the water supply conduit. Another problem associated with pressure regulators is that air can become trapped in the pressure regulator and pass into the water supply conduit, which can seriously harm birds. The air may result from, among other things, ineffective sealing of the valve element within the pressure regulator, or by the passage of fluid through channels of different diameters.

OBJECTS AND SUMMARY

Accordingly, it is an object of the present invention to provide a pressure regulator for watering systems for poultry and the like that can be rigidly secured quickly and easily to the supports for the water supply conduit.

It is a further object of the present invention to provide a pressure regulator having a valve element with a tight seal.

It is a further object of the present invention to provide a pressure regulator that is able to effectively trap and exhaust air trapped in the system.

In accordance with these and other objects, the present invention provides a pressure regulator for a drinking system for birds or other animals. The drinking system desirably includes a fluid supply conduit and may also include a plurality of interconnected elongated supports supporting the fluid supply conduit and extending substantially parallel to the fluid supply conduit. The elongated supports may have an inverted Y-shaped cross section, including an upright member and two base flanges.

In accordance with a preferred embodiment of the invention, the pressure regulator comprises a housing that includes a fluid inlet portion and a fluid outlet portion and defines a channel. The pressure regulator also includes a valve element contained within the housing for providing fluid flow communication between the channel and the fluid supply conduit, and a first engaging member joined to the housing for engaging the elongated supports.

The first engaging member has a pair of opposed ends, each end including a plurality of flexible fingers extending generally parallel to the fluid supply conduit for engaging a respective elongated support. Preferably, each finger includes an engaging surface and the engaging surface of each finger faces opposite the engaging surface of an adjacent finger. Desirably, a central one of the fingers on each end of the first engaging member includes a boss extending from its engaging surface adapted to be received by an aperture of the respective elongated support. The engaging fingers rigidly engage the elongated supports quickly and easily.

If desired, the pressure regulator may further include a pair of second engaging members joined to the housing for engaging the flanges of the elongated supports to further enhance the engagement with the elongated supports. In a preferred embodiment, each second engaging member includes a pair of elongated members joined to the housing that extend generally parallel to the fluid supply conduit. Desirably, each elongated member defines a channel, and each second engaging member includes an interconnecting member joined to the housing interconnecting the proximal ends of the second engaging member. Each interconnecting member desirably is generally V-shaped. The second engaging members can engage the flanges in any suitable manner.

The housing also defines a valve bore, and the valve element is moveable between a closed position in which the valve element is substantially within the valve bore and an open position in which at least a portion of the valve element is outside the valve bore. A spring is contained within the housing and is engaged with, or otherwise associated with, the valve element for urging the valve element to the closed position.

A seal is associated with the valve element for sealing the valve bore when the valve element is in the closed position. The seal, which preferably is circular, has a top surface, a bottom surface, and a peripheral edge that extends from the top surface beyond the bottom surface to form a lip. The outer peripheral edge desirably is inclined radially inwardly as it extends from the top surface. The configuration of the seal, including its lip, enhances its sealing function.

Desirably, the seal can be readily removed and replaced. For example, in accordance with a preferred embodiment, the valve element includes a plunger having a disk member for abutting the seal and a retainer removably engageable with the plunger for retaining the seal. The plunger desirably includes a fastening member that is configured to removably engage the seal and the retainer. The fastening member desirably is adapted to engage the spring so that the spring can be positioned quickly and easily and so that it can remain in place when other parts of the pressure regulator are disassembled.

Desirably, the housing has an inlet end and an outlet end and the valve bore is defined between the inlet and outlet ends. The housing defines a central channel downstream of the valve bore. The diameter of the central channel is greater than the diameter of the valve bore permitting air to accumulate within the central channel as fluid passes from the valve bore toward the outlet end. An air exhaust port is associated with the housing downstream of the valve bore, and defines an air passageway in fluid flow communication with the central channel to exhaust the accumulated air from the central channel. Desirably, the air exhaust port is in the form of a cylindrical member extending from the housing that is engageable with a sight tube.

The housing desirably is configured to facilitate assembly and disassembly for cleaning, inspection or removal of the seal. In a preferred embodiment, for example, the housing includes a central portion between the fluid inlet and outlet portions. The central portion and the fluid outlet portion are desirably integral with each other, and the inlet portion is removably engageable with the central portion. One end of the inlet portion defines the inlet end, and the other end of the inlet portion extends into the central channel and includes a flange that defines the valve bore.

Accordingly, the pressure regulator in accordance with a preferred embodiment of the present invention can be rigidly secured quickly and easily to the elongated supports for the fluid supply conduit. The seal of the pressure regulator enhances the performance of the apparatus. The pressure regulator also is able to effectively exhaust air that may become trapped in the housing of the pressure regulator.

The pressure regulator in accordance with a preferred embodiment of the invention facilitates quick and easy assembly and disassembly and removal and replacement of the seal. Access to the valve element is readily obtained by disengaging the fluid inlet portion from the central portion. After the valve element is removed and the retainer is disengaged from the plunger, the seal can be readily removed and replaced.

BRIEF DESCRIPTION OF DRAWINGS

The present invention and the advantages thereof will become more apparent upon consideration of the following detailed description when taken in conjunction with the accompanying drawings of which:

FIG. 9 is a partial fragmentary and partial cross section view of the pressure regulator of FIGS. 1 and 2 illustrating the valve element in the open position;

FIG. 10 is a cross section view taken along the lines 10—10 of FIG. 9, illustrating the first engaging member engaged with one of the elongated supports; and FIG. 11 is a cross section view of the seal, taken along its center axis, of the pressure regulator of FIGS. 1 and 2.

DETAILED DESCRIPTION OF THE PREFERRED EMBODIMENTS

Figure 1:
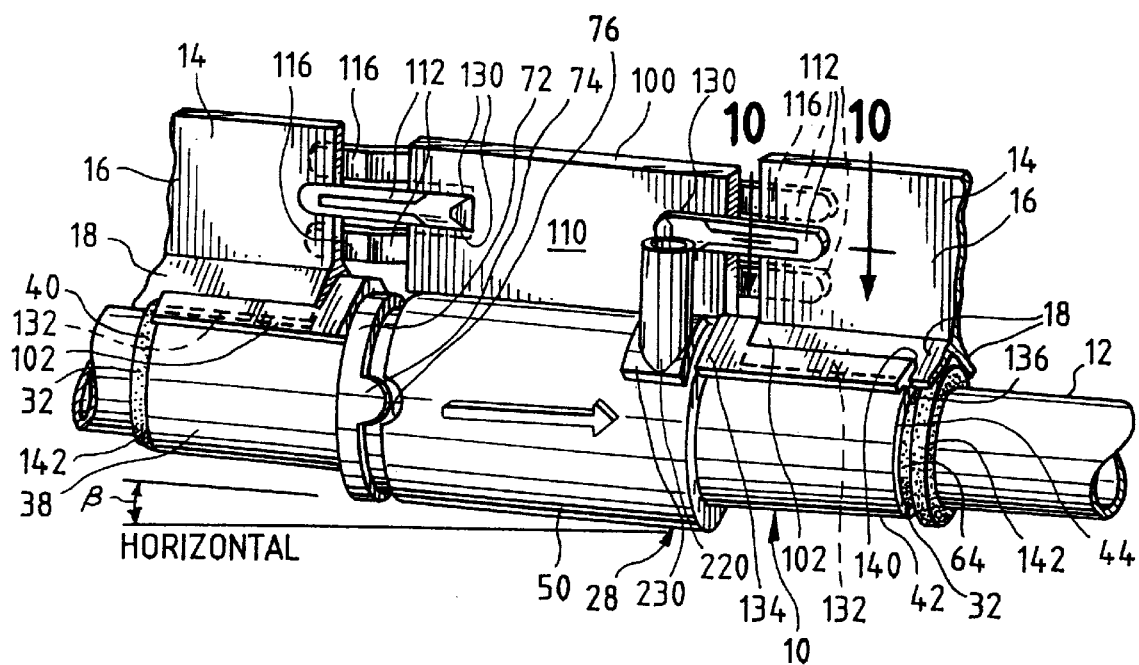
FIG. 1 is a perspective view of a pressure regulator in accordance with a preferred embodiment of the invention and a partial fragmentary view of a fluid supply conduit and the elongated supports for the fluid supply conduit engaged with the pressure regulator.

FIG. 1 discloses a pressure regulator 10 in accordance with a preferred embodiment of the invention. The pressure regulator 10 is preferably used in connection with a watering system for birds or other animals, which desirably includes a fluid supply conduit 12, a plurality of nipple drinkers (not shown), a plurality of elongated supports 14 for supporting the fluid supply conduit 12, a plurality of other pressure regulators 10, and a plurality of vertical site tubes (not shown) engaged with the pressure regulators 10 for providing a visual indication of the fluid pressure within the fluid supply conduit 12. Each elongated support 14 desirably has an inverted Y-shaped cross section, including an upright member 16 and a pair of base flanges 18, and extends parallel to the fluid supply conduit 12.

The watering system may be contained within a poultry house having a floor extending at a predetermined slope, indicated by angle β in FIG. 1. The fluid supply conduit 12 is mounted overlying the floor such that the fluid supply conduit is substantially parallel to the floor and, thus, at the same slope as the floor.

Figure 2:
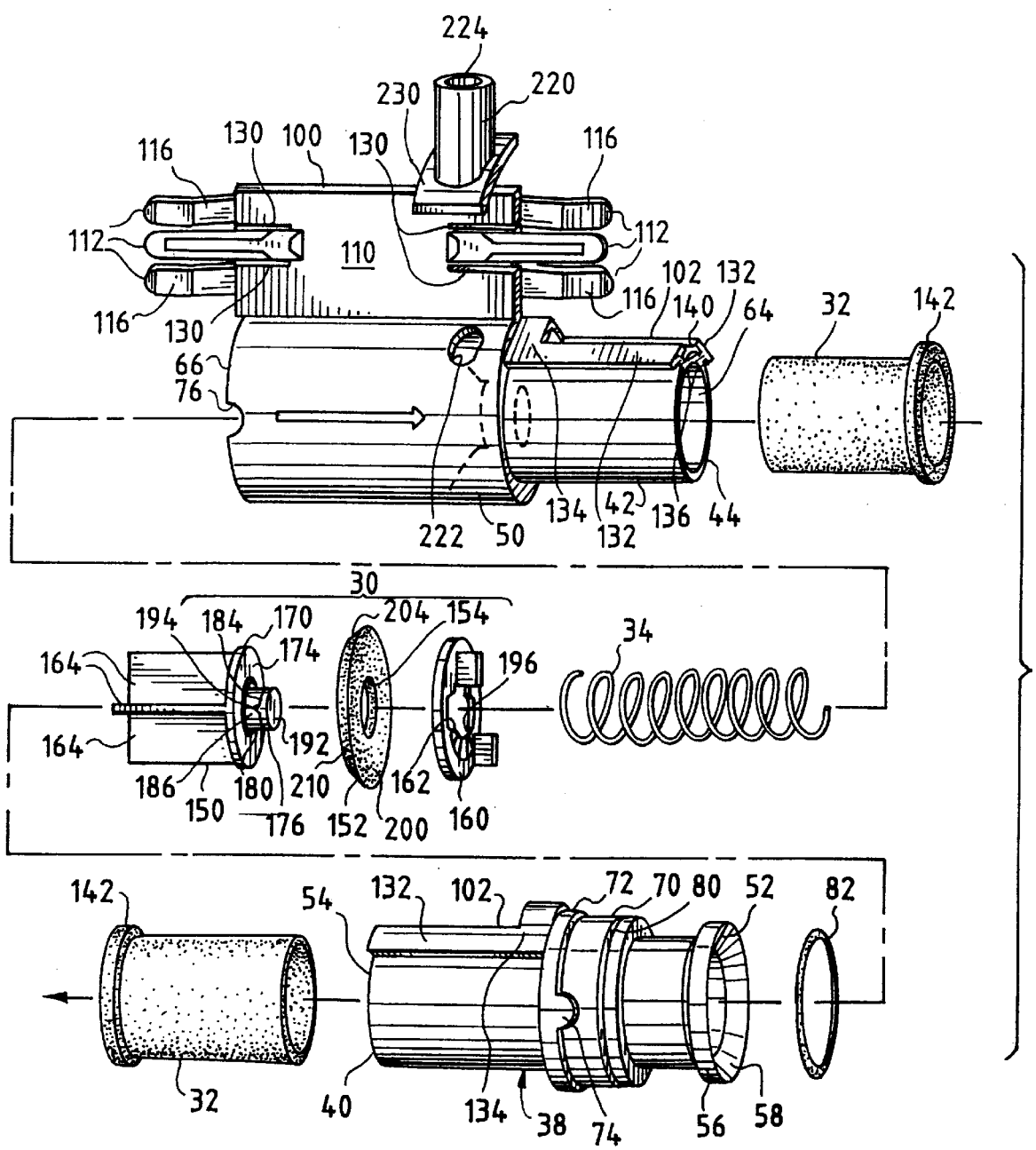
FIG. 2 is an exploded view of the pressure regulator of FIG. 1.
Figure 3:
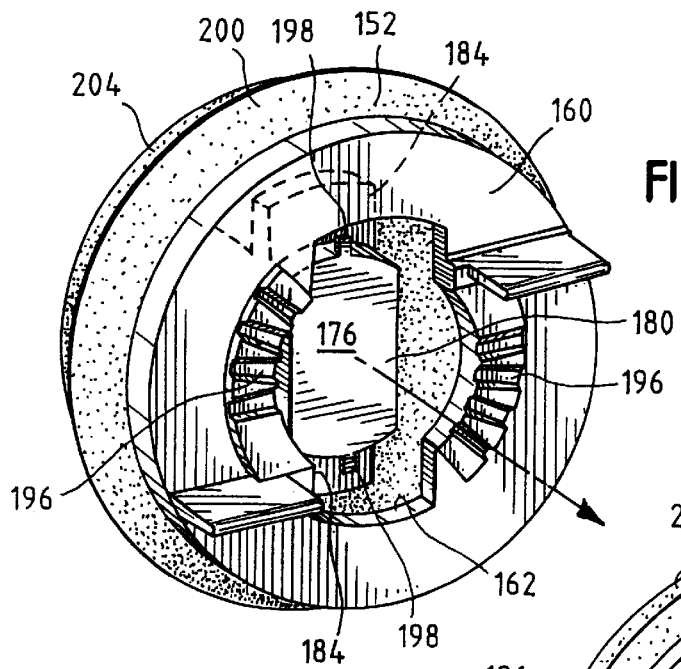
FIG. 3 is a partial fragmentary view of the valve element of the pressure regulator of FIGS. 1 and 2, illustrating the fastening member of the plunger being received by the hole defined by the seal and by the aperture defined by the retainer.
Figure 4:
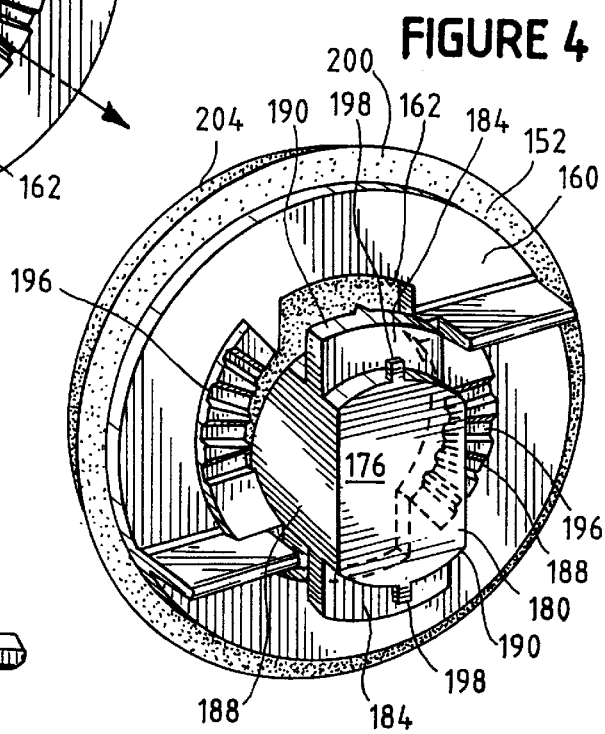
FIG. 4 is a perspective view similar to FIG. 3, illustrating the fastening member received by the hole defined by the seal and the aperture defined by the retainer.
Figure 5:
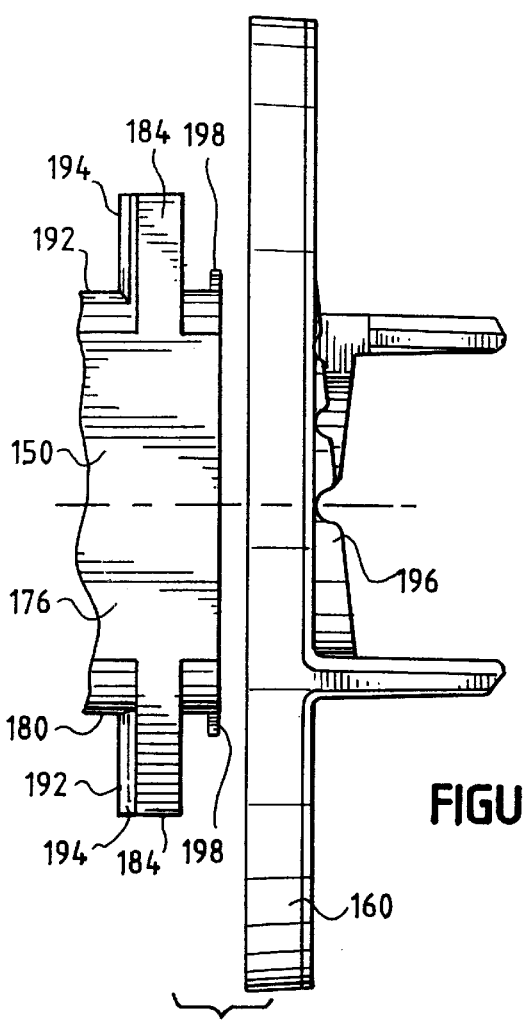
FIG. 5 is a side elevation view of the fastening member being received by the aperture defined by the retainer.
Figure 6:
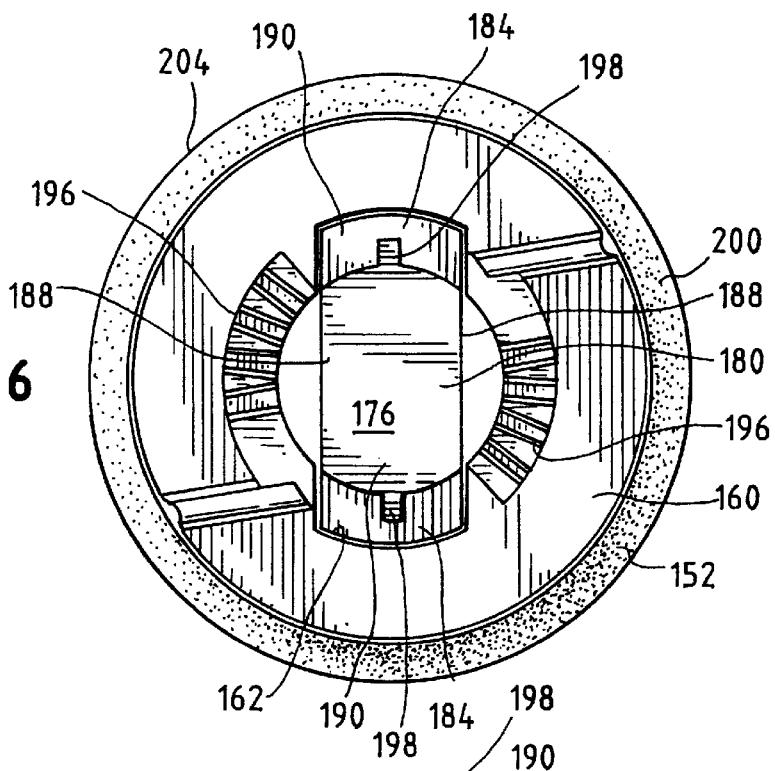
FIG. 6 is a front elevation view of the fastening member received by the hole defined by the seal and by the aperture defined by the retainer.
Figure 7:
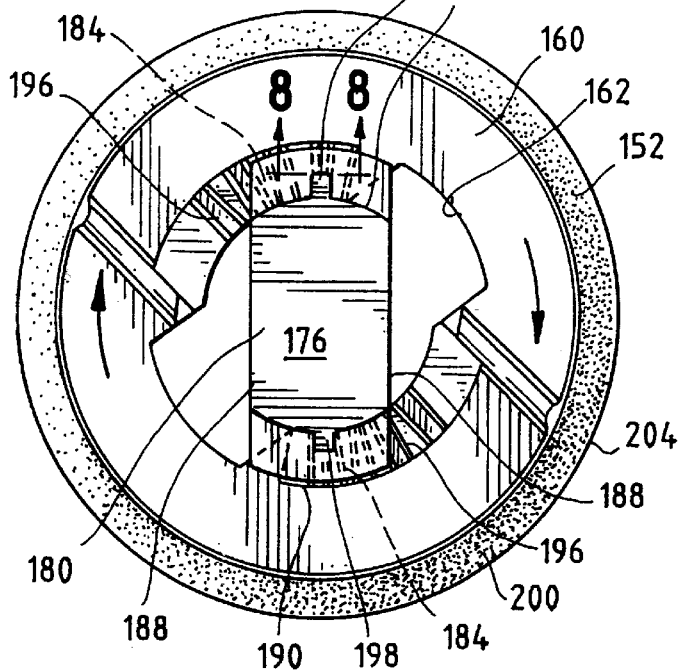
FIG. 7 is a front elevation view of the fastening member and retainer of FIG. 6 after the retainer has been twisted relative to the fastening member and seal.
Figure 8:
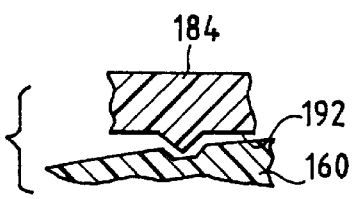
FIG. 8 is a cross section view taken along the lines 8—8 of FIG. 7, illustrating one of the locking ribs of the fastening member engaged with the ridges of the retainer.

In a preferred embodiment, each pressure regulator 10 comprises a housing 28, and a valve element 30, a pair of liners 32, and a coil spring 34 received by the housing. The housing 28 comprises a fluid inlet portion 38 that includes a fluid inlet end 40, a fluid outlet portion 42 that includes a fluid outlet end 44, and a central portion 50 joining together the fluid inlet and outlet portions 38 and 42. The fluid inlet portion 38 defines a fluid inlet channel 54, and the end of the fluid inlet portion opposite the fluid inlet end 40 defines a valve bore 52, in fluid flow communication with the fluid inlet channel 54, for receiving the valve element 30. The valve bore 52 desirably is defined by a flange 56 that includes an inner surface 58 that is inclined radially outwardly, as illustrated by FIG. 2.

The fluid outlet portion 42 defines a fluid outlet channel 64, and the central portion 50 defines a central channel 66 in fluid flow communication with the fluid outlet portion 42. The central channel 66 is in fluid flow communication with the fluid inlet channel 54 when the valve element 30 is in an open position. The diameter of the central channel 66 is greater than the diameters of the fluid inlet and fluid outlet channels 54 and 64. The outer diameter of the central portion 50 desirably is greater than the outer diameters of the fluid inlet and outlet portions 38 and 42.

In the illustrated embodiment, the central portion 50 and the fluid outlet portion 42 are integral with each other, and the fluid inlet portion 38 is removably engaged with the central portion. The fluid inlet portion 38 desirably includes a collar 70 for engaging the central portion 50. The outer diameter of the collar 70 is substantially the same or slightly less than the diameter of the central channel 66 so that the collar can be received snugly within the central channel and engage the central portion 50 by friction fit. The fluid inlet portion 38 also includes an annular rim 72 adjacent the collar 70 for abutting one end of the central portion 50, and a U-shaped engaging nub 74 that is received by a U-shaped recess 76 defined by the one end of the central portion 50. The collar 70 also defines an annular recess 80 that receives an O-ring seal 82.

The central portion 50 desirably includes an integral inner cylindrical portion 90 adjacent the fluid outlet for abutting the downstream end of the spring 34. Desirably, the central portion 50 also includes three integral guide members 92 interconnecting the inner cylindrical portion 90 and the inner wall of the central portion 50. The guide members 92 also extend upstream from the cylindrical portion 90 to provide a void 94 for receiving the spring 34 and to keep the spring in alignment with the cylindrical portion 90. The housing 28 may be constructed of PVC or any other suitable material.

The pressure regulator 10 is engaged with the fluid supply conduit 12 and the elongated supports 14 such that the fluid inlet portion 38 is upstream of the fluid outlet portion 42. The water pressure at the fluid inlet end 40 urges the valve element 30 toward the open position, thereby tending to enlarge the fluid passageway 96 around the valve element 30. The spring 34 and the water pressure at the fluid outlet end 44, on the other hand, urges the valve element 30 toward the closed position, thereby tending to restrict the passageway 96.

The illustrated pressure regulator 10 also includes a first engaging member 100 for engaging the upright members 16 of the elongated supports 14 and a pair of second engaging members 102 for engaging the flanges 18 of the elongated supports 14. The first engaging member 100, which desirably is integral with the housing 28, includes a generally rectangular portion 110 that is and three flexible engaging fingers 112 extending from each of the ends of the rectangular portion for engaging respective elongated supports 14. The rectangular portion 110 and the engaging fingers 112 desirably extend substantially parallel to the fluid supply conduit 12.

Each of the engaging fingers 112 includes an engaging surface 116 in the form of a flat face for engaging the elongated supports 14, and the engaging surface of each center engaging finger 112 faces in a direction opposite the direction in which the engaging surface of the other two respective engaging fingers 112 face. The center engaging finger 112 desirably also includes a boss 120 extending from its engaging surface 116 adapted to be received by an aperture 122 defined by the respective elongated support 14. The illustrated boss 120 has a generally triangular cross section and includes a camming surface 124 and a flat locking ledge 126 that extends generally perpendicular to the fluid supply conduit 12 and faces the proximal direction. In the illustrated embodiment, a pair of slots 130 are defined on the rectangular portion 110 adjacent the proximal end of each center engaging finger 112 to provide further flexibility to the engaging fingers 112.

Each of the second engaging members 102 includes a pair of flat elongated members 132 extending parallel to the housing 28 and a V-shaped connecting member 134 connecting the proximal ends of the elongated members. The elongated members 132 and the connecting member 134 are joined to the housing 28 by a neck 136. Each of the elongated members 132 extends generally tangentially from the housing 28 to define a channel 140. In the illustrated embodiment, one of the second engaging members 102 is integral with the fluid inlet portion 38 and one of the second engaging members 102 is integral with the fluid outlet portion 42.

The second engaging members 102 can engage the flanges 18 of the elongated supports 14 in any suitable manner, depending upon the dimensions of the second engaging members and the flanges. In the illustrated embodiment, for example, the flanges 18 of the respective elongated support 14 are received within the channels 140 and abut the V-shaped member 134. Alternatively, the flanges 18 may nest on top of the elongated members 132 and connecting members 134. Still further, the flanges 18 may wrap around the elongated members 132 and connecting members 134.

The liners 32 desirably are generally cylindrical and adapted to be received snugly within the respective fluid inlet end 40 or fluid outlet end 44. Each liner 32 may also include a rim 142 for abutting the respective fluid inlet end 40 or fluid outlet end 44. The inner walls of the liners 32 may include ribs to facilitate engagement with the fluid supply conduit 12. The liners 32 may be constructed of any suitable material such as, for example, rubber or the like.

The illustrated valve element 30 includes a plunger 150, a circular seal 152 defining a circular hole 154, and a retainer 160 defining an aperture 162. The plunger 150 includes four radially-extending and circumferentially-spaced fins 164, a disk member 170 having a front face 174 for abutting the seal 152, and a fastening member 176 extending from the front face of the disk member for removably engaging the seal 152 and the retainer 160. The fastening member 176 includes a stem 180 and a pair of opposed cantilevers 184. The stem 180 has a circular cross section at its base to define a circular seal-engaging member 186. The outer diameter of the circular seal-engaging member 186 is substantially the same as the inner diameter of the seal 152. The plunger 150 and the retainer 160 may be constructed of PVC or any other suitable material. The seal 152 desirably is constructed of rubber and is sufficiently flexible to permit its removal from the fastening member 176.

The stem 180, substantially along the rest of its length, includes a pair of opposed linear sides 188 and a pair of opposed arcuate sides 190. The cantilevers 184 and the front face 174 of the disk member 170 define a pair of voids 192 for receiving the seal 152 and the retainer 160. An elongated locking rib 194 extends from the bottom of each cantilever 184 for engaging the retainer 160 as hereinafter described. The top surface of the cantilevers 184 and the portion of the stem 180 extending above the cantilevers 184 define engaging surfaces for engaging the spring 34.

The fastening member 176 desirably is also adapted to releasably engage the spring 34 in any suitable manner, so that the spring can be positioned quickly and easily relative to the housing 28 and so that the spring can remain in position if some of the parts of the pressure regulator 10 are disassembled. In the illustrated embodiment, for example, the fastening member 176 includes a pair of tabs 198 for engaging an end of the spring 134. The illustrated tabs 198 are diametrically opposed and located at a distal end of the fastening member 176, and each tab is located in alignment with a respective one of the cantilevers 184.

The retainer 160 is adapted to twistingly engage the fastening member 176. The illustrated retainer 160 is generally circular and, as illustrated in FIGS. 3, 4, 6 and 7, the aperture 162 for receiving the fastening member 176 complements the cross section of the stem 180 and, thus, includes a circular center and a pair of diametrically opposed winged portions for receiving the cantilevers 184. The retainer 160 includes a pair of series of locking ridges 196 for adjustably engaging the elongated locking ribs 194 as the retainer 160 is twisted. The retainer 160 also includes a pair of wings to facilitate twisting of the retainer 160 relative to the plunger 150.

The seal 152 desirably is generally circular, and is disposed about the seal 152 engaging member and between the retainer 160 and the disk member 170. The seal 152 desirably has a circular top surface 200 and a circular bottom surface 202 and an outer peripheral edge 204. The outer diameter of the circular top surface 200 desirably is greater than the outer diameter of the circular bottom surface 202. The outer peripheral edge 204 of the seal 152 is inclined inwardly from the top surface 200 to the bottom surface 202 and extends beyond the bottom surface to define a lip 210. The inclined peripheral edge 204 complements the valve bore 52 and enables a tight fit with the flange 56 of the fluid inlet portion 38 when the valve element 30 is in the closed position.

Accordingly, with this embodiment, the seal 152 can be removed quickly and easily from the plunger 150. The retainer 160 is twisted relative to the fastening member 176 so that the aperture 162 is aligned with the cantilevers 184 and the tabs 198 of the fastening member and the retainer 160 can be removed. Because it is flexible, the seal 152 can then be removed from the fastening member 176. Thereafter, a new seal 152 can be place on the disk and secured in place by placing the retainer 160 on the fastening member 176 and twisting the retainer 160 in place.

The pressure regulator 10 also includes an air exhaust port 220 joined to the housing 28 and disposed about an aperture 222 defined by the central portion 50 adjacent the fluid outlet portion 42. The air exhaust port 220 defines an air channel 224 in communication with the aperture 222. The air exhaust port 220 desirably is cylindrical and includes an arcuate connecting member 230 that may be adhered to the central portion 50 by any suitable method, such as by an adhesive or the like. The air exhaust port 220 desirably is adapted to receive the vertical site tube which, exhausts the air and also enables an observer to determine the pressure within the pressure regulator 10.

Because of the configuration of the housing 28 and the location of the air exhaust port 220, the pressure regulator 10 provides an efficient manner of trapping and exhausting air that can accumulate in the housing 28 as fluid flows therethrough. The air trapping occurs because the diameter of the central channel 66 is greater than the diameter of the fluid inlet channel 54, which causes air to accumulate in the central channel 66 as fluid passes through the valve bore 52 and into the fluid outlet portion 42. The air exhaust port 220, because of its location, facilitates the release of the air trapped from the pressure regulator 10.

The foregoing description is for purposes of illustration only and is not intended to limit the scope of protection accorded this invention. The scope of protection is to be measured by the following claims, which should be interpreted as broadly as the inventive contribution permits.

What is claimed is:

1. A pressure regulator for a drinking system for birds or other animals, the drinking system including a fluid supply conduit and elongated supports supporting the fluid supply conduit and extending substantially parallel to the fluid supply conduit, the pressure regulator comprising:

(a) a housing including a fluid outlet portion and a fluid inlet portion and defining a channel;

(b) a first engaging member joined to the housing, the first engaging member having a pair of opposed ends, each end including a plurality of flexible fingers extending generally parallel to the fluid supply conduit for engaging a respective elongated support; and (c) a valve element contained within the housing for providing fluid flow communication between the channel and the fluid supply conduit.

2. The pressure regulator respective of claim 1 wherein each of the fingers includes an engaging surface for engaging the respective elongated support and wherein the engaging surface of each finger faces opposite the engaging surface of an adjacent finger.

3. The pressure regulator of claim 2 wherein one of the fingers on each end of the first engaging member includes a boss extending from the engaging surface of said one finger, the boss adapted to be received by an aperture of the respective elongated support.

4. The pressure regulator of claim 3 wherein each boss has a generally triangular cross section.

5. The pressure regulator of claim 3 wherein each boss includes a locking surface that extends generally perpendicular to the engaging surface and faces the proximal direction.

6. The pressure regulator of claim 1 wherein the first engaging member includes a generally rectangular portion extending generally parallel to the fluid supply conduit, the fingers extending from the opposed ends of the rectangular portion.

7. The pressure regulator of claim 1 wherein the first engaging member is integral with at least a portion of the housing.

8. The pressure regulator of claim 1 further comprising a pair of second engaging members for engaging flanges of the elongated supports.

9. The pressure regulator of claim 8 wherein each second engaging member includes a pair of elongated members joined to the housing and extending generally parallel to the fluid supply conduit.

10. The pressure regulator of claim 9 wherein each second engaging member further includes an interconnecting member joined to the housing and interconnecting proximal ends of the elongated members.

11. The pressure regulator of claim 10 wherein each interconnecting member is generally V-shaped.

12. The pressure regulator of claim 8 wherein the second engaging members are integral with the housing.

13. The pressure regulator of claim 1 wherein the housing further includes a central portion between the fluid inlet portion and the fluid outlet portion, the fluid inlet portion being removably engaged with the central portion.

14. The pressure regulator of claim 13 wherein the central portion is integral with the first engaging member and the fluid outlet portion.

15. The pressure regulator of claim 1 wherein the housing defines a valve bore and the valve element is moveable between a closed position in which the valve element is substantially within the valve bore and an open position in which at least a portion of the valve element is outside the valve bore, the valve element including a seal for sealing the valve bore when the valve element is in the closed position, the seal having a top surface, a bottom surface substantially parallel to the top surface, and an outer peripheral edge that extends from the top surface beyond the bottom surface to form a bottom lip.

16. The pressure regulator of claim 15 wherein the seal is substantially circular and the outer peripheral edge is inclined radially inwardly as it extends from the top surface.

* * * * *